United States Patent
Elbers et al.

(10) Patent No.: US 8,543,011 B2
(45) Date of Patent: Sep. 24, 2013

(54) RECEIVING APPARATUS AND METHOD FOR ELECTRONIC NOISE COMPENSATION IN PHASE MODULATED OPTICAL TRANSMISSION

(75) Inventors: Jörg-Peter Elbers, Fuerstenfeldbruck (DE); Helmut Griesser, Backnang (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 562 days.

(21) Appl. No.: 12/810,378

(22) PCT Filed: Oct. 9, 2007

(86) PCT No.: PCT/EP2007/060691
§ 371 (c)(1),
(2), (4) Date: Jun. 24, 2010

(87) PCT Pub. No.: WO2009/046759
PCT Pub. Date: Apr. 16, 2009

(65) Prior Publication Data
US 2010/0296821 A1    Nov. 25, 2010

(51) Int. Cl.
*H04B 10/06* (2011.01)
(52) U.S. Cl.
USPC ............................. 398/203; 398/202; 398/208
(58) Field of Classification Search
USPC ........................................ 398/203, 204–208
See application file for complete search history.

(56) References Cited

U.S. PATENT DOCUMENTS

| | | | | |
|---|---|---|---|---|
| 4,868,896 | A * | 9/1989 | Pietzsch | 398/204 |
| 5,355,243 | A * | 10/1994 | King | 398/203 |
| 7,085,501 | B1 * | 8/2006 | Rickard et al. | 398/202 |
| 7,333,732 | B2 * | 2/2008 | Domagala | 398/155 |
| 7,826,750 | B2 * | 11/2010 | Schairer et al. | 398/188 |
| 2007/0201879 | A1 * | 8/2007 | Liu | 398/188 |
| 2008/0025733 | A1 * | 1/2008 | Nazarathy et al. | 398/209 |
| 2008/0075472 | A1 * | 3/2008 | Liu et al. | 398/202 |
| 2009/0129788 | A1 * | 5/2009 | Seimetz | 398/208 |
| 2010/0296821 | A1 * | 11/2010 | Elbers et al. | 398/203 |

* cited by examiner

*Primary Examiner* — Nathan Curs
*Assistant Examiner* — Tanya Ngo (57) ABSTRACT

A receiving apparatus and method for processing a differential phase shift keying signal carrying a plurality of symbols are disclosed to provide for improved compensation of linear and non-linear noise in phase modulated optical transmission. The receiving apparatus comprises an input unit for receiving electrical signals derived from an optical signal and a calculation unit for calculating a current value of a decision variable. The current value is indicative of a differential phase shift in the optical signal between a currently received symbol and a previously received symbol as a function of the optical signal power of the optical signal for the currently received symbol and at least one previous value of the decision variable. The receiving apparatus also comprises a decision unit for determining the differential phase shift from the current value of the decision variable obtained from the calculation unit to obtain the currently received symbol.

11 Claims, 8 Drawing Sheets

RECEIVING APPARATUS AND METHOD FOR ELECTRONIC NOISE COMPENSATION IN PHASE MODULATED OPTICAL TRANSMISSION

TECHNICAL FIELD

The present invention relates to a receiving apparatus and method for processing a differential phase shift keying signal carrying a plurality of symbols.

BACKGROUND

Phase shift keying (PSK) is a modulation scheme for transmitting data by changing or modulating, the phase of a reference signal, constituting a carrier wave. PSK uses different phases, commonly two or four, wherein for each a unique pattern of binary bits is assigned. Each bit pattern forms a symbol that is represented by the particular phase. In demodulation, the phase of the received signal is determined and is mapped back to the symbol it represents to recover the original data. Thereby, the phase of the received signal is compared to the unshifted reference signal. This process is called coherent detection.

Alternatively, which is more widely used, non-coherent detection may be used. Here, instead of setting the phase of the wave, data may be modulated onto the carrier wave by changing the phase by a specific amount with respect to a previous phase shift. Therefore, a signal that has been differentially encoded to comprise information may simply be demodulated by detecting the phase between two successively received symbols, i.e. the changes in the phase of the received signal rather than the phase itself are determined. Since this scheme depends on the difference between successive phases, it is termed differential phase shift keying (DPSK).

In non-coherent demodulation or detection, demodulators may thus be used, which operate without knowledge of the absolute value of the phase of the incoming signal reducing the complexity of the system but increasing the probability of error. In detail, once a previous symbol is corrupted, i.e. the previous differential phase shift was distorted e.g. by noise; the error will propagate to the next symbol, since the previous phase is used for the determination of the next symbol. Therefore, it is important to reduce noise in the system to obtain correct symbols.

The carrier wave is usually realized by optical transmission. Here, phase modulated optical transmission may be corrupted by linear and non-linear phase noise which is accumulated along an optical transmission system.

Linear phase noise is caused, for example, by phase variations resulting from added amplified spontaneous emission (ASE) noise of each optical amplifier in a fiber-optic transmission system.

Non-linear phase noise is caused by a non-linear mixing of a signal with the optical amplifier noise owed to the non-linear refractive index of the transmission fibers, known as Kerr effect. It is often referred to as Gordon-Mollenauer noise.

A convenient way to represent PSK schemes is on a constellation diagram showing constellation points in a complex plane (Argand plane) where the real and imaginary axes are termed the in-phase and quadrature axes intersecting each other perpendicularly. The constellation points related to symbols are usually positioned with uniform angular spacing around a circle. For example, in quadrature phase shift keying (QPSK), which uses four different phases, four constellation points are distributed along the circle, preferably so that in each quadrant of the diagram there is one constellation point. In this example, two bits per symbol represented by a constellation point can be encoded.

Both the linear and non-linear phase noise spread signal constellation points, albeit in a different way, and degrade the transmission performance of optical differential phase shift keying (DPSK) and differential quadrature phase shift keying (DQPSK) signals. In other words, the phase relation between successive symbols changes with phase noise, increasing the error rate.

For simplicity, a self-homodyne scheme is often used to demodulate optical phase modulated signals as it eliminates the need for a local phase reference at the receiver, as explained above with respect to DPSK. Such a scheme aggravates, however, the noise impact because a severe corruption of the previous symbol is likely to cause a corruption of the current symbol also, since in this scheme the phase corresponding to the previous symbol constitutes the reference. In the linear regime, self-homodyne reception yields a performance penalty of ~0.5 dB for DPSK and ~2 dB for DQPSK signals when compared to ideal homodyne detection, as discussed in patent application, EP 1 694 017 A1.

For mitigation of the linear phase noise and specifically the base line penalty of self-homodyne detection, receivers with electronic compensators based on multi-symbol phase estimation (MSPE) or multiple symbol differential detection (MSDD) have been proposed, for example by H. Leib in "Data-aided noncoherent demodulation of DPSK" IEEE Trans. Commun., Vol. 43, 1995 and U.S. Pat. No. 5,017,883, respectively.

An adaptation of MSPE to optical phase modulated systems with self-homodyne detection can be found, for example, in the papers by X. Liu, "Generalized data-aided multi-symbol phase estimation for improving receiver sensitivity in direct-detection optical m-ary DPSK", Optics Express, Vol. 15, No. 6, 2007 and "Receiver sensitivity improvement in optical DQPSK and DQPSK/ASK through data-aided multisymbol phase estimation", Proc. ECOC'06, paper We2.5.6., 2006.

Existing solutions for optical DPSK and DQPSK reception based on MSPE commonly assume that the signal envelope is constant or only slowly varying at the sampling time of the decision device. Whilst this may be true for ideal systems, e.g. a mismatch from the ideal group velocity dispersion at the receiver and non-linear signal interactions on the transmission link can cause intersymbol interference (ISI) and deteriorate the result of the MSPE/MSDD detection process. A modified scheme (here referred to as MSPE-E) takes changes in the signal envelope into account. With moderate additional effort in the electronic domain, this scheme can also be used to detect combined optical DQPSK/amplitude shift keying (ASK) (see the above referenced papers by X. Liu) or quadrature amplitude modulated (QAM) signals.

Non-linear phase noise is mostly dependent on the instantaneous intensity of the optical signal. It can be mitigated by reverting the non-linear phase shift which fluctuations in the light intensity cause on the transmission link (non-linear phase noise compensation, NLPC).

However, existing solutions are expensive and tailored for achieving performance improvements either in the linear regime or in the non-linear regime only, using optical or electronic solutions.

SUMMARY

Therefore, the present invention aims at providing a simple and inexpensive way for compensating for linear and non-linear noise in phase modulated optical transmission.

This object is achieved by a receiving apparatus having the features of independent claim 1 and by a receiving method having the features of independent claim 16.

According to one embodiment, there is provided a receiving apparatus for processing a differential phase shift keying signal carrying a plurality of symbols. The receiving apparatus comprises an input unit for receiving electrical signals derived from an optical signal after self-homodyne reception and a calculation unit for calculating a current value of a decision variable. The current value of the decision variable is indicative of a differential phase shift in the optical signal between a currently received symbol and a previously received symbol and is calculated as a function of at least one of the electrical signals representing the optical signal power of the optical signal for the currently received symbol and at least one previous value of the decision variable to correct for phase noise. The receiving apparatus also comprises a decision unit for determining the differential phase shift from the current value of the decision variable obtained from the calculation unit to obtain the currently received symbol.

A receiving apparatus within the meaning of the present application and claims is any apparatus that provides for receiving optical or electrical signals and is capable to further process the signals electronically to obtain a current value of the decision variable for reliably extracting the differential phase shift in an optical system. A differential phase shift is the difference in phase between different parts of the optical signal that have been received at different times, wherein these parts may correspond to different symbols. In a simple case, a decision may be reached by comparing the value of the decision variable to a threshold, but also cases are feasible where the decision comprises more than two states. The expression "decision variable" is also used in the art and denotes a variable useful for accurately obtaining the differential phase shift by taking into account distortion in phase due to phase noise.

Accordingly, calculating the current value of the decision variable by taking into account the optical signal power of the optical signal for the currently received symbol and at least one previous value of the decision variable enables to simultaneously compensate for both linear and non-linear phase noise accumulated along a transmission link, including the loss due to interferometric detection. This scheme allows independent optimization of respective adaptation parameters and achieves substantial performance improvements over the prior art, especially in the non-linear transmission regime.

Since the compensation is performed electronically, the receiving apparatus can be used with standard optical equipment, thus obtaining improved results at negligible additional costs. Additionally, the receiving apparatus may be used together with the same electro-optical arrangements as used for DPSK/DQPSK/DQPSK-ASK signals.

According to an advantageous example, the calculation unit is configured to base the calculation of the decision variable on at least one of a difference between optical signal powers of the optical signal for the currently received symbol and for a previously received symbol, an optical signal power of the previously received symbol, a weighting factor, an adaptation factor determining the strength of non-linear phase noise compensation, a symbol period of the optical signal, and a differential phase shift between the previously received symbol and a symbol received before the previously received symbol. Accordingly, different parameters may be given to the calculation unit to enhance the calculation of the decision variable. In particular, the parameters are considered in electronic processing simplifying the requirements on the calculation unit and keeping the costs low.

According to another advantageous example, the calculation unit is configured to calculate the current value of the decision variable using a multiplication factor representable as a complex exponential function having the adaptation factor and the difference between the optical signal powers of the optical signal for the currently received symbol and for the previously received symbol in the exponent. Accordingly, a value of a decision variable may be calculated that is useful to obtain the differential phase shift more accurately by taking into account non-linear phase noise introduced between the current symbol and the previous symbol.

According to another advantageous example, the calculation unit is configured to perform the calculation of the current value of decision variable on a basis of an equation dependent on a complex envelope of the differentially decoded signal, the adaptation factor, the difference between optical signal powers of the optical signal for the currently received symbol and for the previously received symbol, the weighting factor, the previous value of the decision variable, the optical signal power of the previously received symbol and the differential phase shift between the previously received symbol and a symbol received before the previously received symbol. Accordingly, a value of the decision variable may be calculated electronically that is useful to obtain the differential phase shift more accurately.

According to another advantageous example, the electrical signals correspond to the optical signal power of the optical signal for the currently received symbol and at least one of the real part of the complex envelope of the differentially decoded signal and the imaginary part of the complex envelope of the differentially decoded signal. Accordingly, two electrical signals are sufficient to calculate an accurate value of the decision variable, e.g. for binary phase shift keying (BPSK).

According to another advantageous example, the receiving apparatus further comprises a first delay unit for providing the electrical signal corresponding to the optical signal power of the previously received symbol to the calculation unit to calculate the current value of the decision variable.

Accordingly, the optical signal power can be taken into account in the calculation electronically.

According to another advantageous example, the receiving apparatus further comprises a second delay unit for providing the differential phase shift between the previously received symbol and a symbol received before the previously received symbol to the calculation unit to calculate the current value of the decision variable. Accordingly, a previous differential phase shift can be taken into account electronically in the calculation improving the calculation result.

According to another advantageous example, the decision unit is adapted to feed back a determined differential phase shift to the calculation unit. Accordingly, a previous differential phase shift can be taken into account electronically in the calculation improving the calculation result.

According to another advantageous example, the receiving apparatus further comprises an electro-optical arrangement for converting the optical signal into the electrical signals comprising at least one interferometer. Accordingly, electrical signals may be obtained from an optical signal.

According to another advantageous example, the electro-optical arrangement comprises two phase controlled delay interferometers, and preferably two balanced detectors may be connected to the two interferometers so that one balanced detector is arranged at each delay interferometer. Accordingly, an interference signal, such as a complex envelope of a differentially decoded signal can be obtained.

According to another advantageous example, the electro-optical arrangement comprises a free running two path interferometer coupled to a 3×3 optical coupler, and preferably three detectors are connected to the 3×3 optical coupler so that one photo detector is arranged in series at each arm of the 3×3 optical coupler. Accordingly, the complexity of the electro-optical arrangement is reduced compared to two actively phase-controlled delay interferometers, since only one interferometer without phase control can be used.

According to another advantageous example, the receiving apparatus further comprises an electronic phase converter for converting the three signals output from the 3×3 coupler to two electrical signals to be input in said input unit, and preferably the electro-optical arrangement is adapted to provide an electrical signal corresponding to the optical signal power to said input unit. Accordingly, three electrical signals may be provided to the input unit and subsequently to the calculation unit.

According to another embodiment, a receiving method for processing a differential phase shift keying signal carrying a plurality of symbols comprises receiving electrical signals derived from an optical signal after self-homodyne reception; calculating a current value of a decision variable indicative of a differential phase shift in the optical signal between a currently received symbol and a previously received symbol as a function of at least one of the electrical signals representing the optical signal power of the optical signal for the currently received symbol and at least one previous value of the decision variable to correct for phase noise; and determining the differential phase shift from the calculated current value of the decision variable to obtain the currently received symbol. Accordingly, the same additional performance gain achieved with the apparatus is similarly obtained by the above operations that require, if at all, only minor modifications of the electronic processing part, which is a processing device, and hence the additional complexity is low. The method efficiently leads to obtaining the current value of the decision variable and subsequently the current symbol quickly and accurately.

According to another embodiment, a computer program may be provided including instructions adapted to cause data processing means to carry out the method with the above features.

According to another embodiment, a computer readable medium may be provided, in which a program is embodied, where the program is to make a computer execute the method with the above features.

According to another embodiment, a computer program product may be provided, comprising the computer readable medium.

Further advantageous features of the invention are described in the claims.

DETAILED DESCRIPTION OF THE PREFERRED EMBODIMENTS

Preferred embodiments of the invention are described with reference to the figures. It is noted that the following description contains examples only and should not be construed as limiting the invention.

Embodiments of the invention generally relate to processing a differential phase shift keying signal carrying a plurality of symbols, and particularly, to calculate an improved value of a decision variable indicative of a differential phase shift by compensating for linear and non-linear noise electronically so that a differential phase shift may be obtained with high accuracy enabling to correctly decode the symbol represented by the differential phase shift.

In the following, an embodiment of the invention will be described with regard to FIG. 1.

Figure 1:
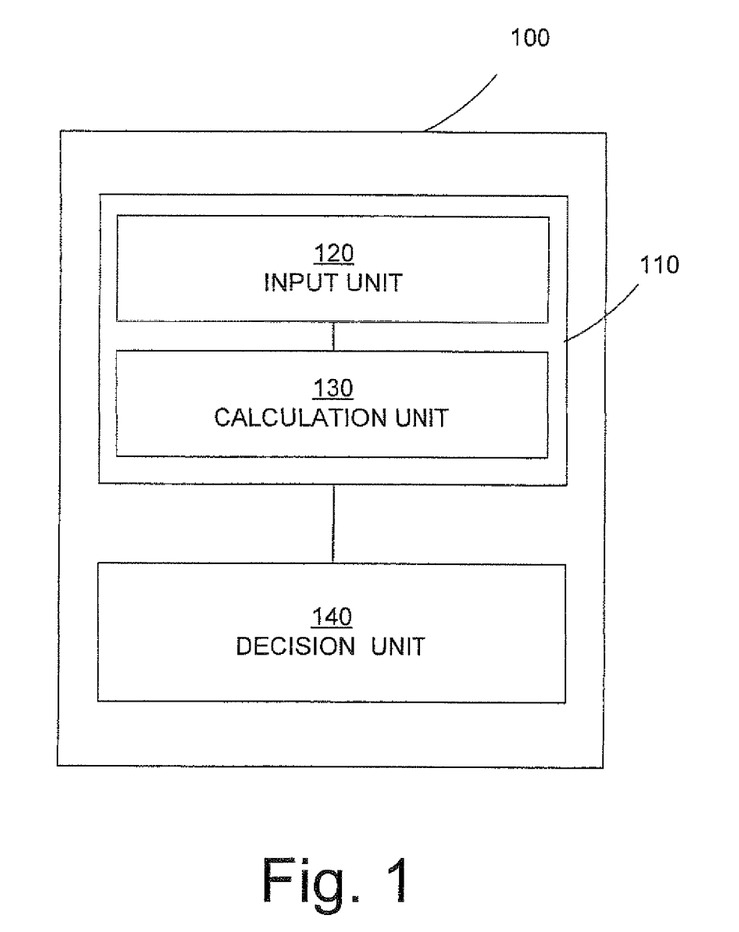
FIG. 1 illustrates a receiving apparatus according to an embodiment of the invention.

FIG. 1 illustrates elements of a receiving apparatus 100 according to an embodiment of the invention, comprising a calculation apparatus 110 with an input unit 120 and a calculation unit 130 as well as a decision unit 140.

The calculation apparatus 110 and the decision unit 140 are connected to exchange data. Further, the input unit 120 and the calculation unit 130 in the calculation apparatus 110 are connected to exchange data that have been input into the input unit 120.

The connections are preferably physical connections by fixed lines connecting individual elements, however, these elements may also be placed on a common circuit board and be wired appropriately.

The skilled person will appreciate that unit should not necessarily be understood as separate hardware elements but as a functional separation.

In a general case, the calculation apparatus 110 and the decision unit 140 may be constituted by a processor with an appropriate interface, which is adapted to carry out the functions of the calculation unit 130 and the decision unit 140 by software and/or hardware. Therefore, the functions might be changed or extended by software update or hardware configuration. The functions performed in the receiving apparatus will be described in detail later.

The calculation unit 130 and the decision unit 140 may be realized by a microprocessor, computer, filed programmable gate array (FPGA) or integrated circuit, such as an ASIC (application specific integrated circuit) but are not limited thereto.

In detail, the receiving apparatus processes a differential phase shift keying signal carrying a plurality of symbols, i.e. different parts of the signal represent different symbols. Thereby, data transmission or symbol transmission is realized on an optical carrier wave.

The input unit 120 receives electrical signals derived from an optical signal after self-homodyne reception. For example, the input unit 120 can be an interface having a number of ports corresponding to the number of electrical signals. It will be discussed below that the electrical signals are derived from an optical signal, wherein the optical signal may be transmitted as a phase modulated carrier wave through a transmission system.

The calculation unit 130 calculates a current value of a decision variable indicative of a differential phase shift in the optical signal between a currently received symbol and a previously received symbol as a function of at least one of the electrical signals representing the optical signal power of the optical signal for the currently received symbol and at least one previous value of the decision variable to correct for phase noise.

In detail, the calculation unit 130 receives the electrical signals from the input unit, in particular, electrical signals comprising an electrical signal representing the optical signal power of the optical signal for the currently received symbol, and uses these electrical signals for the calculation.

Further, a previous value of the decision variable is used for the calculation, which may be the previously calculated value of the decision variable, i.e. the value of the decision variable of one symbol period before, but it is also feasible to use a previously calculated value of two symbol periods before, wherein the symbol period is the time between two symbols, or two bits in BPSK. Using a previous value of the decision variable enhances the accuracy of the current value of the decision variable, since the differential phase shift to be determined is a phase shift between the currently received symbol and the previously received symbol. As will be discussed below, best results may be achieved with multiple previous values of the decision variable constituting a recursion relation averaging over previous values so that errors in individual values of previous decision variables are suppressed.

The decision unit 140 then determines the differential phase shift from the current value of the decision variable obtained from the calculation unit 130 to obtain the currently received symbol. In detail, the decision unit 140 uses the current value of the decision variable and determines depending on its value the differential phase shift, e.g. in DQPSK by plotting the complex value of the decision variable in the complex constellation diagram to obtain a point in the diagram. The position of this point in a quadrant of the constellation diagram is related to the phase difference between the currently received symbol and the previously received symbol. This phase difference should then roughly correspond to 0°, 90°, 180° or 270° in DQPSK, wherein the four phase differences are then mapped to four symbols, e.g. "00", "01", "11" and "10".

Figure 2:
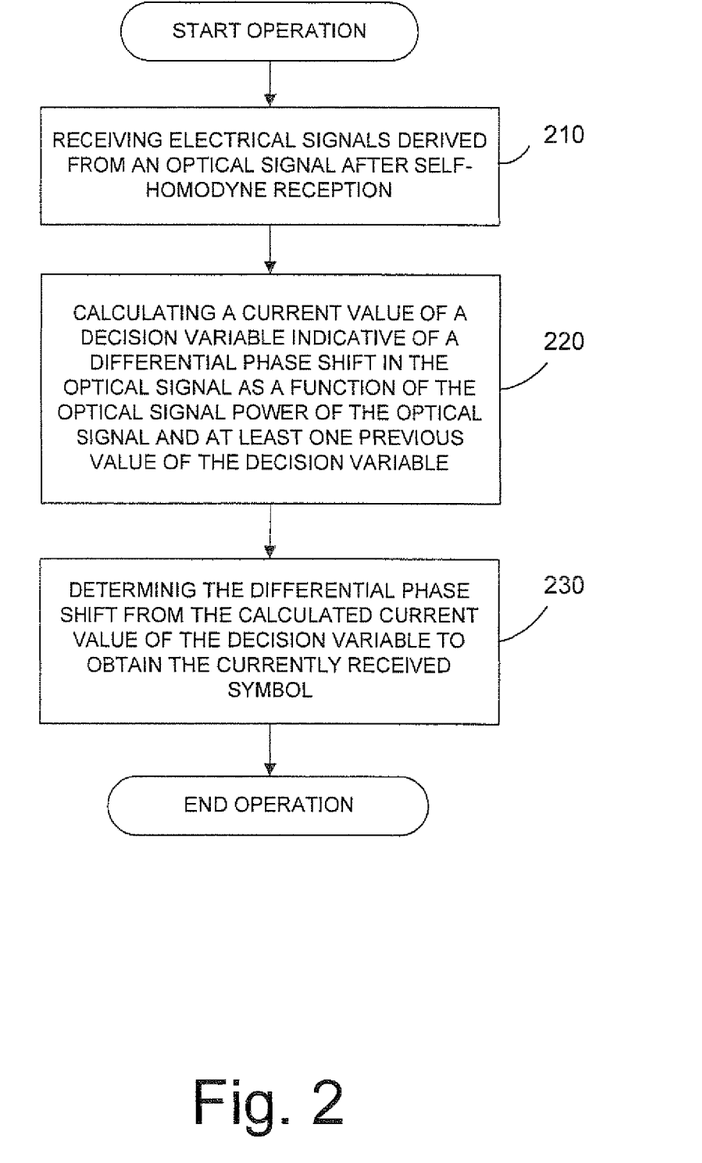
FIG. 2 illustrates operations of a method for processing a differential phase shift keying signal according to an embodiment of the invention.

In the following operations of the receiving apparatus will be described with regard to FIG. 2. FIG. 2 illustrates a flow diagram of operations of a method for processing a differential phase shift keying signal carrying a plurality of symbols, such as during operation of the receiving apparatus 100 shown in FIG. 1.

In a first operation 210, when starting operations, electrical signals are received, which are derived from an optical signal after self-homodyne reception. Electrical signals may comprise an electrical signal corresponding to the optical signal power of the optical signal for the currently received symbol and at least one of a real part of a complex envelope of a differentially decoded signal and an imaginary part of the complex envelope of a differentially decoded signal. How the electrical signals are obtained exactly from the optical signal will be described further below.

Then, in operation 220, the current value of the decision variable indicative of a differential phase shift in the optical signal between a currently received symbol and a previously received symbol is calculated as a function of at least one of the electrical signals representing the optical signal power of the optical signal for the currently received symbol and at least one previous value of the decision variable to correct for phase noise. The decision variable and the calculation thereof will be described in more detail further below.

In operation 230, the differential phase shift is determined from the calculated current value of the decision variable to obtain the currently received symbol in the same way, as has been described above with respect to FIG. 1.

In the following, the application of the receiving apparatus 100 in a fiber optic transmission system and the optical noise associated with such a system will be described with respect to FIG. 3, and afterwards the receiving apparatus 100 and the receiving method will be described in more detail with respect to FIG. 4.

Figure 3:
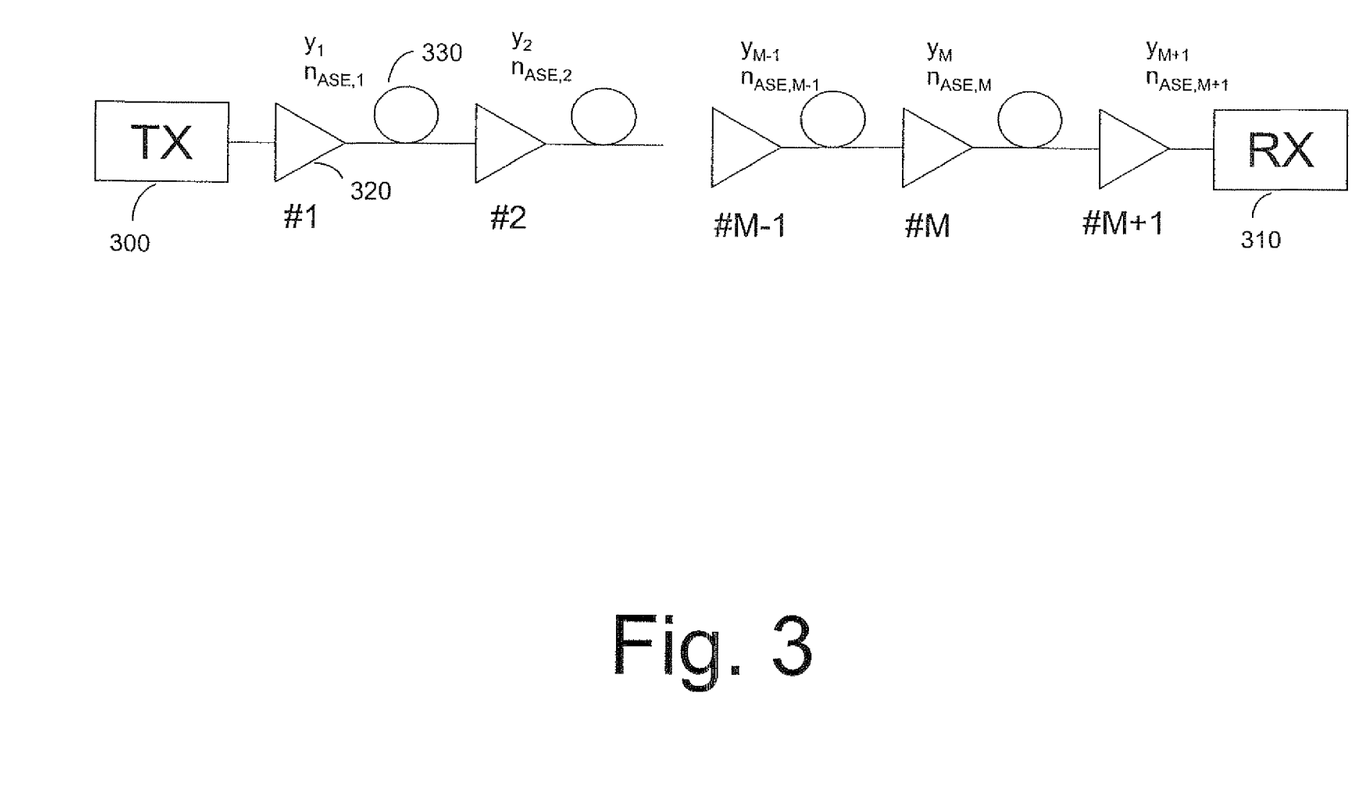
FIG. 3 illustrates a fiber optic transmission system.

FIG. 3 illustrates a fiber-optic transmission system comprising a transmitter 300 and a receiver 310. Such a system may comprise several hundred kilometers of fiber optics with amplifiers. The receiver 310 may be regarded as the receiving apparatus 100. In between the transmitter 300 and the receiving apparatus 310 M+1 amplifiers and M optical fiber spans may be provided. Each amplifier 320 amplifies the electric field of the optical wave but also generates amplified spontaneous emission (ASE) noise. This noise leads to linear phase noise and non-linear phase noise in the fiber optic transmission system, due to refractive index changes in the transmission fiber 330 as well as in the other M-1 transmission fibers.

Figure 4:
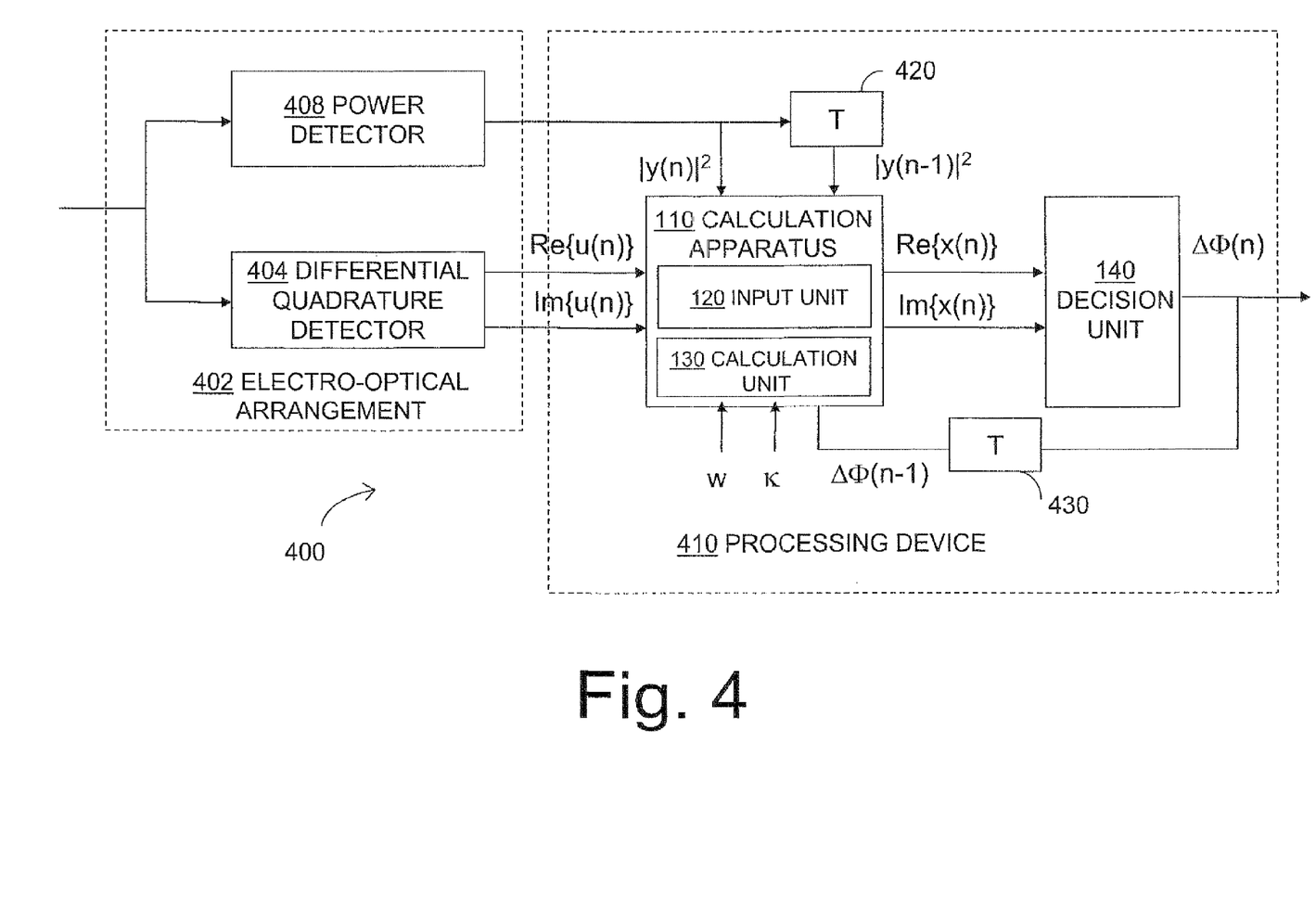
FIG. 4 illustrates a receiving apparatus with an electro-optical arrangement and processing device in detail according to another embodiment of the invention.

FIG. 4 illustrates the receiving apparatus 400 comprising a processing device 410 and preferably an electro-optical arrangement 402 for receiving an optical signal and converting it in electrical signals. The processing device 410 comprises the previously discussed calculation apparatus 110 and decision unit 140 as well as two delay units 420 and 430.

In detail, the block diagram depicted in FIG. 4 represents a self-homodyne receiving apparatus for differentially encoded optical phase-modulated signals according to an embodiment of the present invention.

The skilled person will appreciate that both digital and analogue implementations of the receiving apparatus 400 are possible.

The electro-optical arrangement 402 comprises a differential quadrature detector 404 and a power detector 408 and yields the normalized optical signal power $|y(n)|^2$ and the complex envelope of the differentially decoded signal $$u(n)=y(n)y^*(n-1)e^{j\pi/4} \quad (1),$$

whose phase contains the received data. In equation (1), y(n) denotes the normalized optical field for the currently received symbol and y*(n−1) denotes the complex conjugate of the normalized optical field for the previously received symbol. The complex envelope may also be called the phasor.

Here, a time discrete representation is used throughout for simplicity and without loss of generality, wherein n denotes the n-th symbol received at a time t=n·T. The skilled person will appreciate that the same findings discussed herein, may also be applied to a continuous representation with t and t+T.

Following the above referenced papers by Liu, the decision variable $$x(n)=y(n)z^*(n-1)e^{j\pi/4} \quad (2)$$

may be defined with $$z(n-1)=y(n-1)+wz(n-2)e^{j\Delta\phi(n-1)} \quad (3)$$

being an improved phase reference for the differential detection process. The recursion relation effectively resembles a low pass filtering process and the skilled person will appreciate that other filter functions can be used for averaging the reference phase over previous symbols. w is a weighting factor determining the strength of the filtering process. w=0 resembles standard self-homodyne reception without averaging. The detected differential phase shift $\Delta\phi(n-1)=\phi(n-1)-\phi(n-2)$ is obtained from the decision unit 140 and renormalizes the reference signal to eliminate the influence of phase changes resulting from the data modulation.

As shown in FIG. 4, the decision unit 140 may be adapted to feedback a determined differential phase shift to the calculation apparatus 110 and calculation unit 130. In detail, the decision unit 140 outputs the differential phase shift between the currently received symbol and the previously received symbol and a second delay unit 430 delays the signal, e.g. by an interval T, and then provides the differential phase shift between the previously received symbol and a symbol received before the previously received symbol, which is then input in the calculation apparatus 110.

Substitution of equation (3) in (2 and some simply algebraic manipulation employing equation (1) results in $$x(n) = u(n)\left\{1 + w\frac{x(n-1)}{|y(n-1)|^2}e^{-j[\Delta\phi(n-1)+\pi/4]}\right\}. \quad (4)$$

Whilst equation (4) is in effect an infinite recursion relation, it should be noted that the influence of higher order terms will decay rapidly for $w \leq 1$. Therefore, a value between 0 and 1 may be used and experimentally, a value of 0.8 may be chosen so that the correction is weighted stronger for the last couple of symbols, e.g. roughly 10, than for symbols which have been received even a longer time ago. Particularly for digital realizations, a finite series representation with a limited number of terms may be sufficient for practical implementations with adequate performance.

In equation (4) the term $|y(n-1)|^2$ denotes an optical signal power of the previously received symbol. This optical signal power is provided to the calculation apparatus 110 and subsequently to the calculation unit 130 through the input unit 120 by a first delay unit 420.

Both delay units 420 and 430 may be constituted by a register, memory or flip-flop to hold a certain value of the optical signal power, or to be more concrete an electrical signal representing the optical signal power, for a certain time to give out this value at a later time, in this example after period T corresponding to the difference between two symbols.

Therefore, the delay units 420 and 430 may provide values of the optical signal power and differential phase shift corresponding to a previously received symbol and thus previous values can be taken into account in the calculation performed in the calculation unit 130.

On the other hand, non-linear phase noise leads to fluctuations of y(n) and consequently also fluctuations in the phasor u(n) which are not considered in equation (4).

In a multi-span optical transmission system, such as the fiber-optic transmission system shown in FIG. 3, the non-linear phase shift of y(n) due to the Kerr effect can be modelled by $$\phi_{nl}(n) = -\sum_{m=1}^{M}\gamma_m\left|y_m(n) + \sum_{l=1}^{m}n_{ASE,l}(n)\right|^2 L_{eff,m}. \quad (5)$$

The index m denotes the m-th fiber span, $\gamma_m$ and $L_{eff,m}$ are the non-linear coefficient and the effective non-linear length of the m-th fiber, respectively. $y_m$ denotes the normalized optical field of the signal at the input of the m-th fiber span and $n_{ASE,m}$ the ASE contribution of the m-th amplifier as discussed with respect to FIG. 3.

The effect of the non-linear phase shift is mitigated by reverting it at the side of the receiving apparatus. As only the aggregate optical power is observable at the receiving apparatus and not the individual signal and noise contributions at each span as contained in equation (5), the variance of the non-linear phase noise is substantially reduced but cannot completely be eliminated.

In the following, non-linear phase noise compensation is integrated into execution of the above-discussed MSPE algorithm and independent adaptation factors are provided for both.

This is done by assuming a modified input signal for the normalized optical field $$\tilde{y}(n) = y(n)e^{j\kappa|y(n)|^2} \quad (6)$$

and repeating the calculation of equations (1)-(4), the equation $$x(n) = u(n)e^{j\kappa(|y(n)|^2 - |y(n-1)|^2)}\left\{1 + w\frac{x(n-1)}{|y(n-1)|^2}e^{-j[\Delta\phi(n-1)+\pi/4]}\right\} \quad (7)$$

results, which describes a possible representation of the function to be implemented in the calculation unit 130 of the calculation apparatus 110 depicted in FIG. 4. It should be noted that this function is just one specific example useful for correcting linear and non-linear noise and the invention should not be construed to the specific representation of this function, since similar dependencies may be expressed in other similar ways leading to similar results.

Here, the exponential function $e^{j\kappa(|y(n)|^2 - |y(n-1)|^2)}$ may be understood as follows. In contrast to random noise, deterministic noise is proportional to the optical power. Therefore, using this exponential function a possible phase error between the currently received symbol and the previously received symbol may be compensated for by rotating back the portion of the phase influenced by noise proportional to the optical power, i.e. the optical power of the currently received symbol minus the optical power of the previously received symbol.

In equation (7) $\kappa$ denotes an adaptation factor determining the strength of the non-linear phase compensation, wherein $\kappa=0$ equals no non-linear phase compensation. In practice the adaptation factor $\kappa$ and the weighting factor w are optimized adaptively, but an approximate value for $\kappa$ may be derived as follows:

$$\kappa_{opt} \approx \frac{\sum_{m=1}^{M}\gamma_m\text{Re}\{y_{M+1}(n)y_m^*(n)\}\sum_{k=1}^{m}\langle|n_{ASE,k}(n)|^2\rangle L_{eff,m}}{|y_{M+1}(n)|^2\sum_{m=1}^{M+1}\langle|n_{ASE,l}(n)|^2\rangle} \approx \quad (8)$$

$$\approx \frac{\sum_{m=1}^{M}\gamma_m\sum_{k=1}^{m}\langle|n_{ASE,k}(n)|^2\rangle L_{eff,m}}{\sum_{m=1}^{M+1}\langle|n_{ASE,l}(n)|^2\rangle} \approx \gamma L_{eff}\frac{M}{2}$$

The parameters in equation (8) have been described above, and M+1 denotes that the M+1 amplifier has been taken into consideration.

Several assumptions have been made when deriving equation (8). First, it is assumed that a high optical signal-to-noise ratio (OSNR) at the receiving apparatus is present. The second approximation holds if the dispersion management is such that the signal shape is resembled at the output of each amplifier and the third approximation holds for identical spans. In the simple case of identical spans and the non-linear phase noise being the dominant impairment, it can be shown that NLPC reduces the non-linear phase noise variance or increases the reach of the system.

In summary, the differential quadrature detector 404 provides the calculation apparatus 110 with the complex envelope of the differentially decoded signal 411), e.g. in DQPSK its real part and imaginary part, and the power detector 408 provides the calculation apparatus 110 with the optical signal power for the currently received symbol. This optical signal power may also be held in the second delay unit 420 to be provided to the calculation apparatus 110 at a later time T so that the calculation apparatus 110 is provided with the optical signal power for the currently received symbol and the optical signal power for the previously received symbol.

Similarly, the calculation apparatus is provided with the differential phase shift $\Delta\Phi(n)$ fed back to the first delay unit 430, where it is delayed and then provided to the calculation apparatus 110 as the differential phase shift between the previously received symbol and a symbol received before the previously received symbol $\Delta\Phi(n-1)$. The differential phase shift is determined in the decision device 140 using the current value of the decision variable $x(n)$ from the calculation apparatus 110, namely the real and imaginary part of the current value of the decision variable in DQPSK. Finally, the calculation apparatus 110 is provided with the weighting factor w and the adaptation factor κ, which have been described in detail above.

With the above-described inventive scheme only a moderate increase in complexity in the electronic domain, i.e. of the processing device 410 is necessary, wherein the complexity in the optical domain is not increased.

In the following, the electro-optical arrangement 402 comprising the power detector 408 and the differential quadrature detector 404 will be described in more detail with respect to FIGS. 5 and 6.

Figure 5:
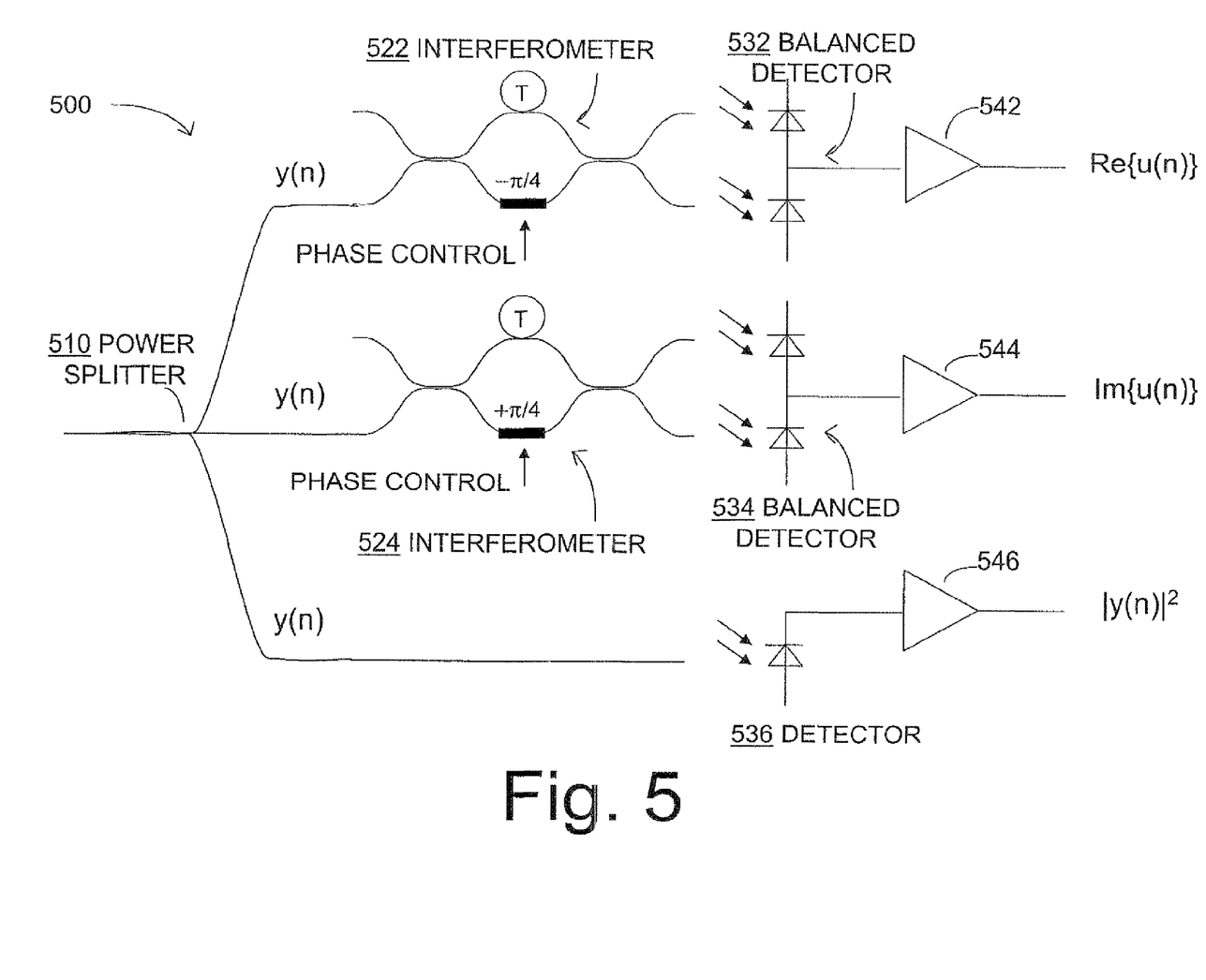
FIG. 5 illustrates an example of an electro-optical arrangement according to an embodiment of the invention.
Figure 6:
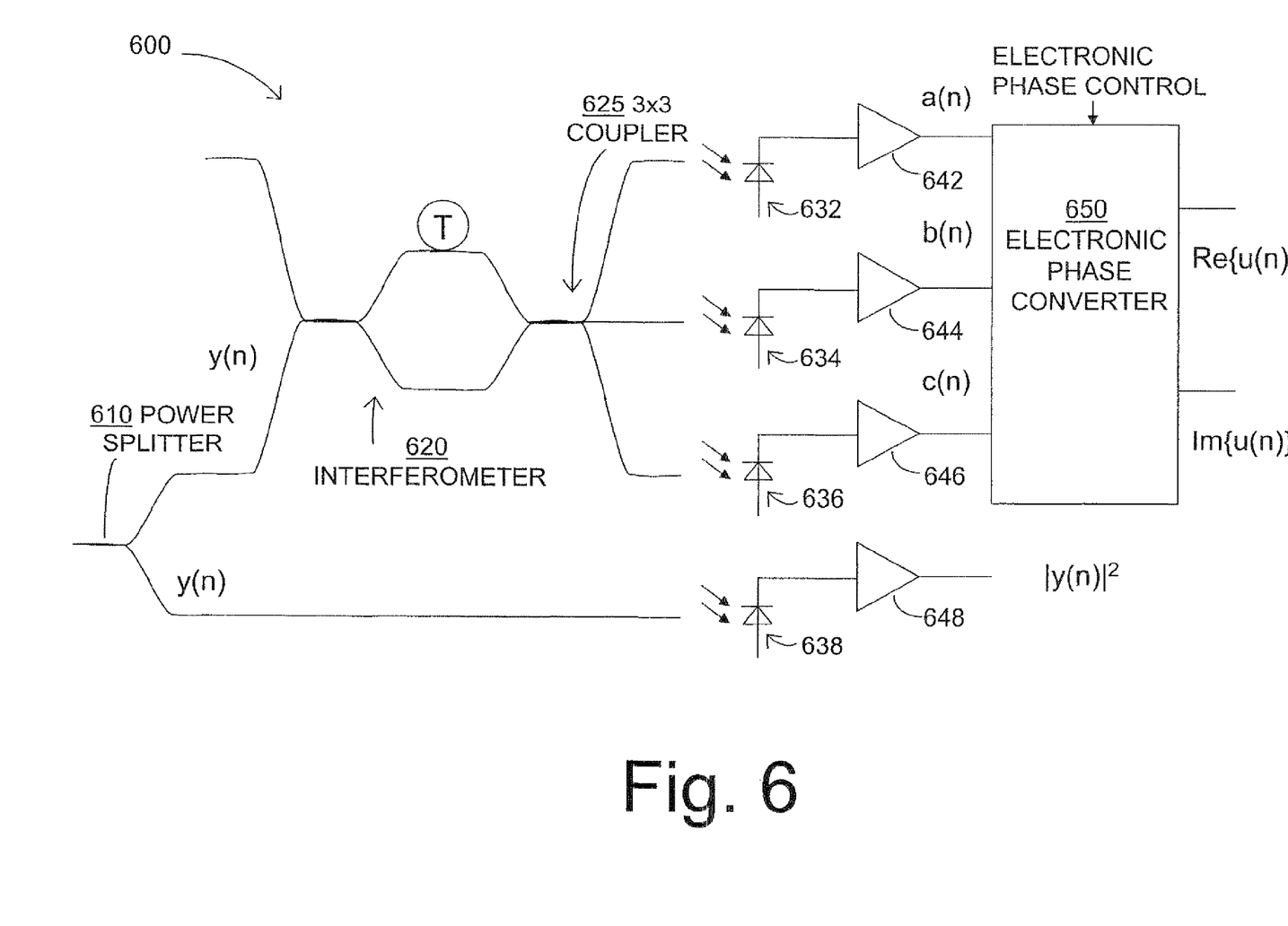
FIG. 6 illustrates another example of an electro-optical arrangement according to another embodiment of the invention.

The improved functionality and performance of the inventive receiving apparatus can be obtained by using the electro-optical arrangement of FIG. 5 or FIG. 6, for example.

FIG. 5 illustrates an electro-optical arrangement 500 according to an embodiment of the invention.

The electro-optical arrangement 500 may comprise a power splitter 510, two phase controlled Mach-Zehnder interferometers 522 and 524, two balanced detectors 532 and 534, a detector 536 and three amplifiers 542, 544, 546.

The power splitter 510, which may be a beam splitter, a 1×3 optical coupler or the like, splits the optical signal received by the receiving apparatus from an optical transmission system into three similar parts of the optical field. The detectors may be high-speed photodiodes.

The optical signal transmitted through the lowest arm in FIG. 5 is supplied to the detector 536 detecting the optical signal power and converting it into an electrical signal, which may then preferably be supplied to the amplifier 546 that outputs an electrical signal corresponding to the optical signal power. The detector 536 and the amplifier 546 in FIG. 5 constitute the power detector 408 of FIG. 4.

The two other arms coming from the power splitter 510 and carrying the optical signal are each connected to the phase-controlled Mach-Zehnder interferometer 522 and phase-controlled Mach-Zehnder interferometer 524, respectively. Each Mach-Zehnder interferometer 522, 524 has two arms or paths and constitutes an optical delay interferometer with one arm being delayed by T, wherein T is the symbol period of the optical signal.

Further, an appropriate phase difference between the two interferometer arms is provided. The phase difference in the first Mach-Zehnder interferometer 522 is set to $-\pi/4$ and the phase difference of the second Mach-Zehnder interferometer 524 is set to $\pi/4$.

In this arrangement, the two interferometers are differently affected by environmental influences, such as temperature, and thus phase control should be provided to maintain the phase difference between the two interferometer arms and also between the two interferometers 522 and 524.

The arrangement of the interferometers 522 and 524 with the delay T is suitable for self-homodyne reception, wherein the phase reference of a local oscillator is replaced with the symbol received during the previous period or interval. In DQPSK, the first interferometer 522 and the second interferometer 524 correspond to an in-phase demodulator and a quadrature-demodulator.

In FIG. 5, two signals with different phase may each be obtained after each interferometer and the two optical signals of the first interferometer 522 having a difference in phase are detected by the balanced detector 532, and the corresponding electrical signal may be amplified by the amplifier 542. This electrical signal may be considered the real part of the complex envelope of the differentially decoded signal $\text{Re}\{u(n)\}$ in DQPSK.

Similarly, the two optical signals of the interferometer 524 are detected by the balanced detector 534 and the corresponding electrical signal may be amplified by the amplifier 544 leading to an electrical signal, which may be considered the imaginary part of the complex envelope of the differentially decoded signal $\text{Im}\{u(n)\}$ in DQPSK.

Therefore, the two interferometers 542 and 524, the balanced detectors 532 and 534 as well as the amplifiers 542 and 544 constitute the differential quadrature detector 404 of FIG. 4.

In this arrangement two balanced detectors and two amplifiers are connected to the two phase-controlled delay interferometers so that one balanced detector and one amplifier is arranged in series at each delay interferometer. However, the skilled person will appreciate that a similar arrangement, for example with a different number of amplifiers or different detectors, may lead to the same results. Optionally, the amplifiers may be preamplifiers or may be omitted altogether, for example.

With the electro-optical arrangement, the optical signal received at the power splitter 510 is converted into electrical signals, namely in this case three electrical signals corresponding to the real and imaginary part of the complex envelope of the differentially decoded signal and an electrical signal corresponding to the optical signal power. The delays and transfer functions/bandwidth of the three different electronic paths need to be matched for optimum performance.

These electrical signals are then provided to the processing device 410, which can be analog or digital and has been described in detail in FIG. 4. In the digital case, clock recovery, A/D-conversion and sampling may be applied at the output of the electro-optical arrangement 500.

Next, another embodiment of the invention illustrating another electro-optical arrangement 600 is described with respect FIG. 6. This electro-optical arrangement 600 may also be used together with the processing device 410 of FIG. 4 forming together the receiving apparatus.

The electro-optical arrangement 600 comprise, for example, a power splitter 610, a Mach-Zehnder interferometer 620, a 3×3 coupler 625, four detectors 632, 634, 636, 638, four amplifiers 642, 644, 646, 648, and an electronic phase converter 650.

In this embodiment described in FIG. 6, the electro-optical arrangement 600 comprises only one Mach-Zehnder interferometer which is preferably a free running two path interferometer coupled to a 3×3 optical coupler 625 and has a delay equal to the bit period or symbol period, if a symbol contains more than one bit, which is the case in DQPSK.

Therefore, the interferometer does not need any active optical phase control, thereby eliminating any optical control required at the receiving side. This may be understood by considering that each signal of the three arms coming from the interferometer and the 3×3 coupler is shifted by $2\pi/3$ with respect to each other so that no information is lost, and if required, the phase may be rotated back electronically at a later stage for each of the three signals the same way.

Here, the power splitter 610 may be the same component as in FIG. 5, however, in this case only splitting the optical signal in two parts, wherein one part of the optical signal is transmitted through the lowest arm in FIG. 6 and is detected by the detector 638, which may be a photodiode, and is preferably amplified by the amplifier yielding an electrical signal corresponding to the optical signal power $|y(n)|^2$.

The other part of the optical signal is input into the Mach-Zehnder interferometer 620, which has been described above and does not require phase control. Similarly to the phase controlled Mach-Zehnder interferometers of FIG. 5, the delay interval of T in one of the arms of the interferometer 620 is suitable for self-homodyne reception.

The output of the interferometer 620 of FIG. 6 yields a three phase signal $$\begin{bmatrix} a(n) \\ b(n) \\ c(n) \end{bmatrix} = \frac{1}{6} \left\{ |y(n)|^2 + |y(n-1)|^2 + \begin{bmatrix} 2\text{Re}\{y(n)y^*(n-1)e^{j\phi_{err}}\} \\ 2\text{Re}\{y(n)y^*(n-1)e^{j(\phi_{err}-2\pi/3)}\} \\ 2\text{Re}\{y(n)y^*(n-1)e^{j(\phi_{err}+2\pi/3)}\} \end{bmatrix} \right\} \quad (9)$$

which is detected by the three detectors 632, 634 and 636.

The detectors in the electro-optical arrangement 600 may be photodiodes, high-speed photodiodes, or more specifically single ended photodiodes having optionally electronic preamplifiers. A phase shift of the interferometer translates into the same fading of the phase in the electronic domain so that phase control may be performed electronically at a later stage as discussed above.

Assuming that this fading effect is compensated for by a feed-forward or a closed loop phase control in the electronic domain, the previous two-phase signal of equation (1) can be obtained as $$u(n)=(2a-b-c)+j\sqrt{3}(b-c) \quad (10).$$

It should be noted that the 3×3 coupler 625 does not need to be symmetric for generation of the three phase signal and the subsequent conversion into a two phase signal, wherein the two phase signal corresponds to the signal obtained with the electro-optical arrangement 500 of FIG. 5 after conversion by the electronic phase converter 650 of the three signals output from the 3×3 coupler to two electrical signal to be input in the input unit 120 of the processing device 410.

In FIG. 6, three detectors 632, 634 and 636, and three amplifiers are preferably connected to the 3×3 optical coupler 625 so that one photodetector and one amplifier is arranged in series at each arm of the 3×3 optical coupler 625. This constitutes a simple and cheap arrangement for converting the three parts of the optical signal in electrical signals. However, it should be understood that the invention is not limited to this arrangement and a different amount of amplifiers may be used.

The electrical signal corresponding to the optical signal power $|y(n)|^2$ obtained from the detector 638 and the real and imaginary parts of the complex envelope of the differentially decoded signal obtained from the electronic phase converter 650 are output from the electro-optical arrangement 600 to the input unit 120, similar to the electrical signals of the processing device 410 of FIG. 4.

However, note that the electro-optical arrangement 600 of FIG. 6 needs to provide only four detectors and not five as in FIG. 5, since balanced detectors are not needed and only one free-running interferometer instead of two phase-controlled interferometers is used. Also, compared to a standard self-homodyne DUSK receiver, the electro optical arrangement of FIG. 6 needs only one free-running interferometer instead of two stabilized interferometers.

Figure 7:
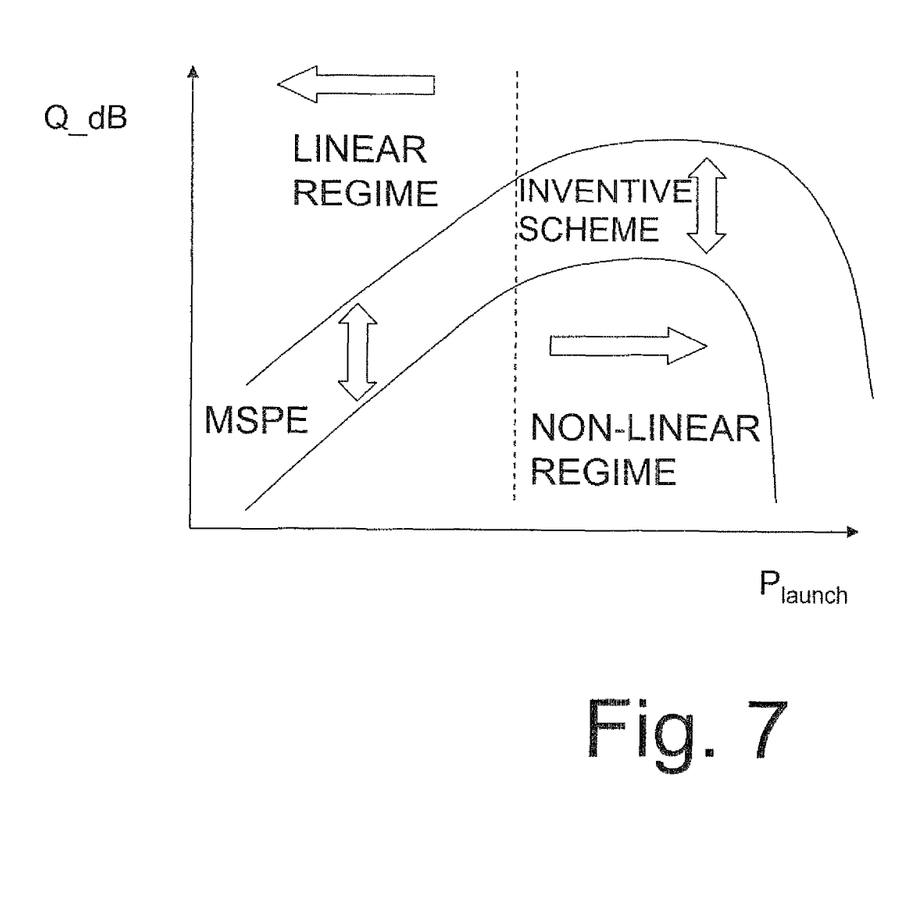
FIG. 7 illustrates the performance improvement achieved with the embodiments of the invention.

FIG. 7 illustrates the performance improvement in the linear regime and the non-linear regime. The launch power of the optical signal is plotted on the x-axis in the diagram of FIG. 7 and the Q-factor is plotted on the y-axis. The performance improvement in the linear regime is mainly through the MSPE scheme whereas in the non-linear regime MSPE and NLPC schemes determine the overall performance improvement together.

Figure 8:
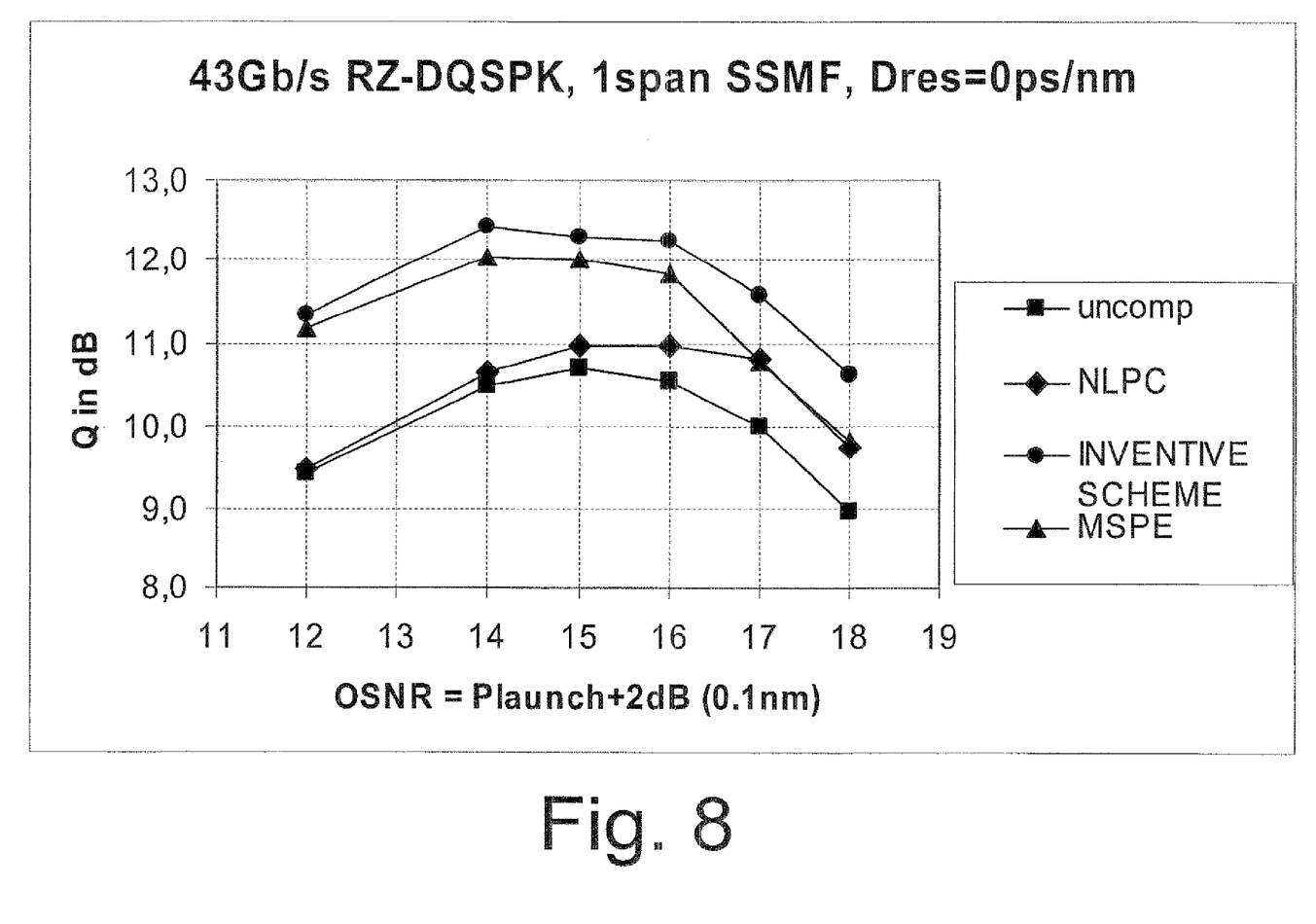
FIG. 8 illustrates a simulation example of the performance improvement of the invention in comparison to other methods.

Finally, FIG. 8 illustrates the effectiveness of the invention in a simulation of a simple configuration. A 43 Gb/s RZ-DQPSK signal, RZ (return to zero) determining the pulse form, is transmitted over 80 km of a standard single mode fiber (SSMF, with dispersion D=17 ps/nm/km, attenuation $\alpha$=0.21 dB/km, $\gamma$=1.37/W/km, residual dispersion Dres=0 ps/nm). The optical signal to noise ratio (OSNR) is equal to the launch power ($P_{launch}$)+2 dB and plotted on the x-axis and the Q-factor is plotted on the y-axis. The SSMF is fully dispersion compensated by a dispersion compensating fiber (DCF). The launch power and the received optical signal to noise ratio (OSNR, referenced to an optical bandwidth of 0.1 nm) are varied between 10 . . . 18 dBm and 12 . . . 20 dB, respectively. High power levels are chosen to obtain a level of non-linear phase noise similar to that generated over a large number of fiber spans. The influence of the optical receive amplifier is neglected. For comparison also a simulation without any compensation scheme (uncomp) is shown in FIG. 8.

The system performance is simulated and assessed by means of the system's Q-factor (a Q of 10 dB equals a bit error ratio of 7.8e−3). Without the transmission link, OSNR=12 dB is required for Q=9.5 dB. The NLPC scheme alone does not yield a significant performance improvement in the linear regime, whereas the performance gain through the MSPE/MSPE-E scheme is reduced in the non-linear regime. The inventive scheme provides best overall performance. It yields a performance improvement of approximately 0.3 dB over the MSPE/MSPE-E scheme in the peak region and a performance improvement of approximately 0.8 dB over the MSPE/MSPE-E/NLPC scheme in the non-linear regime.

In summary, the invention provides an improved transmission performance in the non-linear regime over MSPE and MSPE-E by suitable integration of NLPC into the MSPE-E scheme yielding the described inventive scheme and an improved transmission performance in the linear regime over electronic NLPC implementation.

Although most examples above relate to DQPSK, the invention is not limited to DQPSK and may be applied to all schemes involving a differential phase shift or schemes in which a differential phase shift is mixed with other modulation schemes, such as amplitude shift keying (ASK). For example, quadrature amplitude modulation (QAM), and especially 16-QAM, may benefit from the invention.

According to another embodiment a program may be provided including instructions adapted to cause a data processor that may be included in the processing device 410 or calculation apparatus 110 to carry out combinations of the above-described operations.

The program or elements thereof may be stored in a memory, such as ROM or RAM or other suitable storage device of the processing device 410, and retrieved by the processor for execution.

Moreover, a computer readable medium may be provided, in which the program is embodied. The computer readable medium may be tangible such as a disk or other data carrier or may be constituted by signals suitable for electronic, optic or any other type of transmission. A computer program product may comprise the computer readable medium.

It should be understood that the operations described herein are not inherently related to any particular device or apparatus and may be implemented by any suitable combination of components. The apparatuses, devices and units described in detail above constitute preferred embodiments to perform the operations of the described methods. However, this may not be limited to the same.

It will be apparent to those skilled in the art that various modifications and variations can be made in the apparatuses and devices and methods of the invention as well as in the construction of this invention without departing from the scope of or spirit of the invention.

The invention has been described in relation to particular examples which are intended in all respects to be illustrative rather than restrictive. Those skilled in the art will appreciate that many different combinations of hardware, software and firmware will be suitable for practicing the present invention.

Moreover, other implementations of the invention will be apparent to those skilled in the art from consideration of the specification and practice of the invention disclosed herein. It is intended that the specification and the examples be considered as exemplary only. To this end, it is to be understood that inventive aspects lie in less then all features of a single foregoing disclosed implementation or configuration. Thus, the true scope and spirit of the invention is indicated by the following claims.

The invention claimed is:

1. A receiving apparatus for processing a differential phase shift keying signal carrying a plurality of symbols, comprising
    an input unit for receiving electrical signals $Re(u(n))$, $Im(u(n))$, $|y(n)|^2$ derived from an optical signal after self-homodyne reception;
    a calculation unit for calculating a current value of a decision variable $x(n)$ indicative of a differential phase shift in the optical signal between a currently received symbol and a previously received symbol as a function of at least one of the electrical signals representing the optical signal power of the optical signal for the currently received symbol $|y(n)|^2$ and at least one previous value of the decision variable $x(n-1)$, $x(n-2)$ to correct for phase noise;
    a decision unit for determining the differential phase shift from the current value of the decision variable $x(n)$ obtained from the calculation unit to obtain the currently received symbol;
    an electro-optical arrangement for converting the optical signal into the electrical signals comprising at least one interferometer, wherein the at least one interferometer is a free running two-path interferometer coupled to a 3×3 optical coupler; and
    an electronic phase converter for converting three signals output from the 3×3 coupler two electrical signals to be input in said input unit.

2. The receiving apparatus of claim 1, wherein the calculation unit is configured to base the calculation of the decision variable on at least one of
    a difference between optical signal powers of the optical signal for the currently received symbol and for a previously received symbol $|y(n)|^2 - |y(n-1)|^2$,
    an optical signal power of the previously received symbol $|y(n-1)|^2$,
    a weighting factor w,
    an adaptation factor κ determining the strength of nonlinear phase compensation,
    a symbol period of the optical signal T, and
    a differential phase shift between the previously received symbol and a symbol received before the previously received symbol $\Delta\phi(n-1)$.

3. The receiving apparatus of claim 2, wherein the calculation unit is configured to calculate the current value of decision variable using a multiplication factor representable as $$e^{j\kappa(|y(n)|^2-|y(n-1)|^2)}$$

wherein κ denotes the adaptation factor and $|y(n)|^2-|y(n-1)|^2$ denotes the difference between the optical signal powers of the optical signal for the currently received symbol and for the previously received symbol.

4. The receiving apparatus of claim 2, wherein the calculation unit is configured to perform the calculation of the current value of decision variable $x(n)$ on a basis of an equation representable as:

$$x(n) = u(n)e^{j\kappa(|y(n)|^2-|y(n-1)|^2)}\left\{1 + w\frac{x(n-1)}{|y(n-1)|^2}e^{-j[\Delta\phi(n-1)+\pi/4]}\right\}$$

wherein $u(n)$ denotes a complex envelope of the differentially decoded signal, κ denotes the adaptation factor, $|y(n)|^2-|y(n-1)|^2$ denotes the difference between the optical signal powers of the optical signal for the currently received symbol and for the previously received symbol, w denotes the weighting factor, $x(n-1)$ denotes the previous value of the decision variable, $|y(n-1)|^2$ denotes the optical signal power of the previously received symbol and $\Delta\phi(n-1)$ denotes the differential phase shift between the previously received symbol and a symbol received before the previously received symbol.

5. The receiving apparatus of claim 1, wherein the electrical signals correspond to the optical signal power of the optical signal for the currently received symbol $|y(n)|^2$ and at least one of the real part of the complex envelope of the differentially decoded signal $Re(u(n))$ and the imaginary part of the complex envelope of the differentially decoded signal $Im(u(n))$.

6. The receiving apparatus of claim 1, further comprising a first delay unit for providing the electrical signal corresponding to the optical signal power of the previously received symbol $|y(n-1)|^2$ to the calculation unit to calculate the current value of the decision variable x(n).

7. The receiving apparatus of claim 6, further comprising a second delay unit for providing the differential phase shift between the previously received symbol and a symbol received before the previously received symbol $\Delta\phi(n-1)$ to the calculation unit to calculate the current value of the decision variable x(n).

8. The receiving apparatus of claim 1, wherein the decision unit is adapted to feed back a determined differential phase shift to the calculation unit.

9. The receiving apparatus of claim 1, further comprising three photo detectors connected to the 3×3 optical coupler so that one detector is arranged at each arm of the 3×3 optical coupler.

10. The receiving apparatus of claim 1, wherein the electro-optical arrangement is adapted to provide an electrical signal corresponding to the optical signal power to said input unit.

11. A receiving method for processing a differential phase shift keying signal carrying a plurality of symbols, comprising:

receiving electrical signals Re(u(n), Im(u(n), $|y(n)|^2$ derived from an optical signal after self-homodyne reception;

calculating a current value of a decision variable x(n) indicative of a differential phase shift in the optical signal between a currently received symbol and a previously received symbol as a function of at least one of the electrical signals representing the optical signal power of the optical signal for the currently received symbol $|y(n)|^2$ and at least one previous value of the decision variable x(n−1), x(n−2) to correct for phase noise;

determining the differential phase shift from the calculated current value of the decision variable x(n) to obtain the currently received symbol;

converting the optical signal into the electrical signals, and converting three signals output from a 3×3 coupler to two electrical signals to be input in an input unit.

\* \* \* \* \*